US008644422B2

(12) United States Patent
Gao et al.

(10) Patent No.: US 8,644,422 B2
(45) Date of Patent: Feb. 4, 2014

(54) LOW OVERHEAD PMI AND CQI FEEDBACK AND PAIRING SCHEMES FOR MU-MIMO

(75) Inventors: Shiwei Gao, Kanata (CA); Hua Xu, Kanata (CA); Yongkang Jia, Kanata (CA); Amin Mobasher, Waterloo (CA); Alireza Bayesteh, Waterloo (CA); Zhijun Cai, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 936 days.

(21) Appl. No.: 12/705,482

(22) Filed: Feb. 12, 2010

(65) Prior Publication Data

US 2011/0200131 A1   Aug. 18, 2011

(51) Int. Cl.
*H03K 9/00* (2006.01)
*H04L 27/06* (2006.01)

(52) U.S. Cl.
USPC ............. 375/316; 375/340; 375/346; 455/24; 455/39

(58) Field of Classification Search
USPC ................. 375/219, 220, 221, 222, 375/240.02–240.07, 240.11, 240.22, 375/240.26–240.29, 242, 245, 259, 260, 375/267, 295, 296, 316, 354, 358, 359, 262, 375/324, 340, 346; 370/310; 455/39, 500, 455/515, 69, 73, 86, 91, 115.1, 115.4, 130, 455/24
See application file for complete search history.

(56) References Cited

U.S. PATENT DOCUMENTS

2008/0298482 A1* 12/2008 Rensburg et al. ............. 375/260
2008/0303701 A1   12/2008 Zhang et al.
2009/0046801 A1* 2/2009 Pan et al. ..................... 375/267
2009/0086648 A1   4/2009 Xu et al.
2009/0154588 A1   6/2009 Chen et al.

(Continued)

FOREIGN PATENT DOCUMENTS

WO   2007094832 A2   8/2007

OTHER PUBLICATIONS

3GPP TS 36.211 V8.8.0; 3rd Generation Partnership Project; Technical Specification Group Radio Access Network; Evolved Universal Terrestrial Radio Access (E-UTRA); Physical Channels and Modulation; Release 8; Sep. 2009; 83 pgs.

(Continued)

*Primary Examiner* — Sam K Ahn
*Assistant Examiner* — Linda Wong
(74) *Attorney, Agent, or Firm* — Conley Rose, P.C.; J. Robert Brown, Jr.; Maria L. Sekul

(57) ABSTRACT

A method is provided for searching for a pairing PMI including estimating a MIMO wireless propagation channel from an access point transmitter to a receiver at a UE; quantizing the estimated channel with a codebook consisting of a plurality of codewords, the result being an actual SU-MIMO PMI currently applicable to the UE; estimating the channel quality corresponding to the actual SU-MIMO PMI, resulting in at least one CQI for the UE; constructing a plurality of subsets from a codebook of codewords, wherein each subset comprises potential MU-MIMO PMIs that represent channels that have reduced interference with a channel represented by one of the potential SU-MIMO PMIs; associating each potential SU-MIMO PMI with the subset that comprises the potential MU-MIMO PMIs that represent channels that have reduced interference with the channel represented by that potential SU-MIMO PMI; searching for an appropriate pairing PMI and the associated CQI for the UE.

20 Claims, 16 Drawing Sheets

(56) References Cited

U.S. PATENT DOCUMENTS

| | | |
|---|---|---|
| 2009/0190528 A1 | 7/2009 | Chung et al. |
| 2009/0247214 A1 | 10/2009 | Cai et al. |
| 2009/0274225 A1 | 11/2009 | Khojastepour et al. |
| 2010/0104032 A1 | 4/2010 | Clerckx et al. |
| 2010/0150214 A1 | 6/2010 | Seo et al. |
| 2011/0034192 A1 | 2/2011 | Lim et al. |
| 2011/0200131 A1 | 8/2011 | Gao et al. |
| 2011/0287790 A1 | 11/2011 | Haustein et al. |

OTHER PUBLICATIONS

3GPP TS 36.213 V8.8.0; 3rd Generation Partnership Project; Technical Specification Group Radio Access Network; Evolved Universal Terrestrial Radio Access (E-UTRA); Physical Layer Procedures; Release 8; Sep. 2009; 77 pgs.

3GPP TR 36.814 V0.4.1; 3rd Generation Partnership Project; Technical Specification Group Radio Access Network; Further Advancements for E-UTRA Physical Layer Aspects; Release 9; Feb. 2009; 31 pgs.

3GPP TSG RAN WG1 Meeting #58bis; NTT DOCOMO; Title: Investigation on Enhanced DL MU-MIMO Processing Based on Channel Vector Quantization for LTE-Advanced; R1-094242; Miyazaki, Japan; Oct. 12-16, 2009; 8 pgs.

3GPP TSG RAN WG1 #56 Meeting; Alcatel-Lucent; Title: UE PMI Feedback Signalling for User Pairing/Coordination; R1-090777; Athens, Greece; Feb. 9-13, 2009; 4 pgs.

3GPP TSG RAN WG1 #56 Meeting; Alcatel-Lucent; Title: "Best Companion" Reporting for Improved Single-Cell-MU-MIMO Pairing; R1-090926; Athens, Greece; Feb. 9-13, 2009; 5 pgs.

Yoo, Taesang, et al.; Title: On the Optimality of Multiantenna Broadcast Scheduling Using Zero-Forcing Beamforming; IEEE Journal on Selected Areas in Communications, vol. 24, No. 3; Mar. 2006; pp. 528-541.

Spencer, Quentin H., et al.; Title: Zero-Forcing Methods for Downlink Spatial Multiplexing in Multiuser MIMO Channels; IEEE Transactions on Signal Processing, vol. 52, No. 2; Feb. 2004; pp. 461-471.

Jindal, Nihar; Title: MIMO Broadcast Channels With Finite-Rate Feedback; IEEE Transactions on Information Theory, vol. 52, No. 11; Nov. 2006; pp. 5045-5060.

Weingarten, Hanan, et al., Title: The Capacity Region of the Gaussian Multiple-Input Multiple-Output Broadcast Channel; IEEE Transactions on Information Theory, vol. 52, No. 9; Sep. 2006; pp. 3936-3964.

PCT International Preliminary Report on Patentability; Application No. PCT/US2011/24520; Aug. 6, 2012; 7 pages.

PCT International Search Report; PCT Application No. PCT/US2011/024520; Apr. 22, 2011; 2 pages.

PCT Written Opinion of the International Searching Authority; PCT Application No. PCT/US2011/024520; Apr. 22, 2011; 6 pages.

\* cited by examiner

| CQI index | modulation | Coding rate | SINR (dB) |
|---|---|---|---|
| 1 | QPSK | 0.1523 | -7 |
| 2 | QPSK | 0.2344 | -5.11 |
| 3 | QPSK | 0.3770 | -3.22 |
| 4 | QPSK | 0.6016 | -1.32 |
| 5 | QPSK | 0.8770 | 0.57 |
| 6 | QPSK | 1.1758 | 2.46 |
| 7 | 16QAM | 1.4766 | 4.35 |
| 8 | 16QAM | 1.9141 | 6.24 |
| 9 | 16QAM | 2.4063 | 8.14 |
| 10 | 64QAM | 2.7305 | 10.03 |
| 11 | 64QAM | 3.3223 | 11.92 |
| 12 | 64QAM | 3.9023 | 13.81 |
| 13 | 64QAM | 4.5234 | 15.70 |
| 14 | 64QAM | 5.1152 | 17.60 |
| 15 | 64QAM | 5.5547 | 19.49 |

Table 1

| Pairing PMI encoding | Pairing PMI index | | | |
|---|---|---|---|---|
| | Subset #0 | Subset #1 | Subset #2 | Subset #3 |
| 00 | 0 | 4 | 8 | 12 |
| 01 | 1 | 5 | 9 | 13 |
| 10 | 2 | 6 | 10 | 14 |
| 11 | 3 | 7 | 11 | 15 |

Table 2

| Differential CQI encoding index | Offset (in CQI index) |
|---|---|
| 00 | -1 |
| 01 | -2 |
| 10 | -3 |
| 11 | <= -4 |

Table 3

| SU-MIMO PMI | $\Delta CQI(1)$ | $\Delta CQI(2)$ | $\Delta CQI(3)$ |
|---|---|---|---|
| 0 | 1 | 2 | 3 |
| 1 | 2 | 3 | 0 |
| 2 | 3 | 0 | 1 |
| 3 | 0 | 1 | 2 |

Table 4

| SU-MIMO PMI | $\Delta CQI(1)$ | $\Delta CQI(2)$ | $\Delta CQI(3)$ |
|---|---|---|---|
| 0 | 1 | 2 | 3 |
| 1 | 0 | 2 | 3 |
| 2 | 0 | 1 | 3 |
| 3 | 0 | 1 | 2 |

Table 5

Figure 7

| Subset | Rank-1 code word index | | | | |
|---|---|---|---|---|---|
| CB$_0$ | 1 | 2 | 3 | 8 | 10 |
| CB$_1$ | 0 | 2 | 3 | 9 | 11 |
| CB$_2$ | 0 | 1 | 3 | 8 | 10 |
| CB$_3$ | 0 | 1 | 2 | 9 | 11 |
| CB$_4$ | 5 | 6 | 7 | | |
| CB$_5$ | 4 | 6 | 7 | | |
| CB$_6$ | 4 | 5 | 7 | | |
| CB$_7$ | 4 | 5 | 6 | | |
| CB$_8$ | 9 | 10 | 11 | 0 | 2 |
| CB$_9$ | 8 | 10 | 11 | 1 | 3 |
| CB$_{10}$ | 8 | 9 | 11 | 0 | 2 |
| CB$_{11}$ | 8 | 9 | 10 | 1 | 3 |
| CB$_{12}$ | 13 | 14 | 15 | | |
| CB$_{13}$ | 12 | 14 | 15 | | |
| CB$_{14}$ | 12 | 13 | 15 | | |
| CB$_{15}$ | 12 | 13 | 14 | | |

Figure 8

| Subset | Rank-2 code word index | |
|---|---|---|
| $CB_0^2(p=1)$ | 2 | 10 |
| $CB_1^2(p=1)$ | 3 | 9 |
| $CB_2^2(p=1)$ | 0 | 8 |
| $CB_3^2(p=1)$ | 1 | 11 |
| $CB_4^2(p=1)$ | 7 | |
| $CB_5^2(p=1)$ | 6 | |
| $CB_6^2(p=1)$ | 4 | 7 |
| $CB_7^2(p=1)$ | 5 | 6 |
| $CB_8^2(p=1)$ | 2 | 0 |
| $CB_9^2(p=1)$ | 10 | 3 |
| $CB_{10}^2(p=1)$ | 8 | 11 |
| $CB_{11}^2(p=1)$ | 9 | 1 |
| $CB_{12}^2(p=1)$ | 15 | 13 |
| $CB_{13}^2(p=1)$ | 14 | 15 |
| $CB_{14}^2(p=1)$ | 13 | 12 |
| $CB_{15}^2(p=1)$ | 12 | 14 |

Figure 9a

| Subset | Rank-1 code word index | |
|---|---|---|
| $CB_0^1(p=2)$ | 2 | 8 |
| $CB_1^1(p=2)$ | 3 | 11 |
| $CB_2^1(p=2)$ | 0 | 8 |
| $CB_3^1(p=2)$ | 1 | 9 |
| $CB_4^1(p=2)$ | 6 | |
| $CB_5^1(p=2)$ | 7 | |
| $CB_6^1(p=2)$ | 5 | 7 |
| $CB_7^1(p=2)$ | 4 | 6 |
| $CB_8^1(p=2)$ | 10 | 2 |
| $CB_9^1(p=2)$ | 11 | 1 |
| $CB_{10}^1(p=2)$ | 9 | 0 |
| $CB_{11}^1(p=2)$ | 3 | 10 |
| $CB_{12}^1(p=2)$ | 15 | 14 |
| $CB_{13}^1(p=2)$ | 14 | 12 |
| $CB_{14}^1(p=2)$ | 13 | 15 |
| $CB_{15}^1(p=2)$ | 12 | 13 |

Figure 9b

| Subset | Rank-3 code word index |
|---|---|
| $CB_0^3(p=1)$ | 10 |
| $CB_1^3(p=1)$ | 9 |
| $CB_2^3(p=1)$ | 0 |
| $CB_3^3(p=1)$ | 11 |
| $CB_4^3(p=1)$ | |
| $CB_5^3(p=1)$ | |
| $CB_6^3(p=1)$ | 4 |
| $CB_7^3(p=1)$ | 5 |
| $CB_8^3(p=1)$ | 2 |
| $CB_9^3(p=1)$ | 3 |
| $CB_{10}^3(p=1)$ | 8 |
| $CB_{11}^3(p=1)$ | 1 |
| $CB_{12}^3(p=1)$ | 15 |
| $CB_{13}^3(p=1)$ | 14 |
| $CB_{14}^3(p=1)$ | 13 |
| $CB_{15}^3(p=1)$ | 12 |

Figure 10a

| Subset | Rank-1 code word index |
|---|---|
| $CB_0^1(p=3)$ | 2 |
| $CB_1^1(p=3)$ | 11 |
| $CB_2^1(p=3)$ | 8 |
| $CB_3^1(p=3)$ | 9 |
| $CB_4^1(p=3)$ | 6 |
| $CB_5^1(p=3)$ | 7 |
| $CB_6^1(p=3)$ | |
| $CB_7^1(p=3)$ | |
| $CB_8^1(p=3)$ | 10 |
| $CB_9^1(p=3)$ | 1 |
| $CB_{10}^1(p=3)$ | 0 |
| $CB_{11}^1(p=3)$ | 3 |
| $CB_{12}^1(p=3)$ | 15 |
| $CB_{13}^1(p=3)$ | 14 |
| $CB_{14}^1(p=3)$ | 13 |
| $CB_{15}^1(p=3)$ | 12 |

Figure 10b

| Subset | Rank2 code word index |
|---|---|
| $CB_0^2(p=2)$ | |
| $CB_1^2(p=2)$ | 3 |
| $CB_2^2(p=2)$ | 8 |
| $CB_3^2(p=2)$ | 1 |
| $CB_4^2(p=2)$ | |
| $CB_5^2(p=2)$ | |
| $CB_6^2(p=2)$ | 7 |
| $CB_7^2(p=2)$ | 6 |
| $CB_8^2(p=2)$ | 2 |
| $CB_9^2(p=2)$ | |
| $CB_{10}^2(p=2)$ | 11 |
| $CB_{11}^2(p=2)$ | 10 |
| $CB_{12}^2(p=2)$ | 15 |
| $CB_{13}^2(p=2)$ | 14 |
| $CB_{14}^2(p=2)$ | 13 |
| $CB_{15}^2(p=2)$ | 12 |

Figure 11

| SU-MIMO CQI | MU-MIMO CQI offset | | | |
|---|---|---|---|---|
| | -1 | -2 | -3 | -4 |
| 1 | <=0 | <=0 | <=0 | <=0 |
| 2 | 29.9% | <=0 | <=0 | <=0 |
| 3 | 24.4% | <=0 | <=0 | <=0 |
| 4 | 25.3% | <=0 | <=0 | <=0 |
| 5 | 37.2% | <=0 | <=0 | <=0 |
| 6 | 49.2% | 2.3% | <=0 | <=0 |
| 7 | 59.3% | 18.8% | <=0 | <=0 |
| 8 | 54.3% | 22.9% | <=0 | <=0 |
| 9 | 59.1% | 22.7% | <=0 | <=0 |
| 10 | 76.3% | 40.2% | 8.2% | <=0 |
| 11 | 64.4% | 44.9% | 15.2% | <=0 |
| 12 | 70.3% | 39.9% | 23.3% | <=0 |
| 13 | 72.5% | 46.9% | 20.7% | 6.4% |
| 14 | 76.9% | 52.6% | 29.9% | 6.8% |
| 15 | 84.2% | 62.9% | 40.5% | 19.6% |

Table 6

Figure 14

LOW OVERHEAD PMI AND CQI FEEDBACK AND PAIRING SCHEMES FOR MU-MIMO

BACKGROUND

As used herein, the terms "user equipment" and "UE" can refer to wireless devices such as mobile telephones, personal digital assistants, handheld or laptop computers, and similar devices that have telecommunications capabilities. The term "UE" may also refer to devices that have similar wireless capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Third Generation Partnership Project (3GPP) Long Term Evolution (LTE) and LTE-Advanced (LTE-A). For example, an LTE or LTE-A system might include an evolved Node B (eNB), a wireless access point, or a similar component rather than a traditional base station. As used herein, the terms "eNB" or "access node" will refer to any component of a wireless network, such as a traditional base station, a wireless access point, or an LTE or LTE-A eNB, that creates a geographical area of reception and transmission coverage allowing a UE or a relay node to access other components in a telecommunications system. An access node may comprise a plurality of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 contains tables related to the partitioning of a codebook into subsets, according to an embodiment of the disclosure.

FIG. 8 is a diagram of an example of subset construction with a rank-1 codebook, according to an embodiment of the disclosure.

FIGS. 9a and 9b illustrate companion subsets of an SU-MIMO PMI, according to an embodiment of the disclosure.

FIGS. 10a and 10b illustrate additional companion subsets of an SU-MIMO PMI, according to an embodiment of the disclosure.

FIG. 11 illustrates an additional companion subset of an SU-MIMO PMI, according to an embodiment of the disclosure.

FIG. 14 is a table of data rate gain of MU-MIMO as a function of MU-MIMO CQI offsets, according to an embodiment of the disclosure.

DETAILED DESCRIPTION

Figures 1, 2:
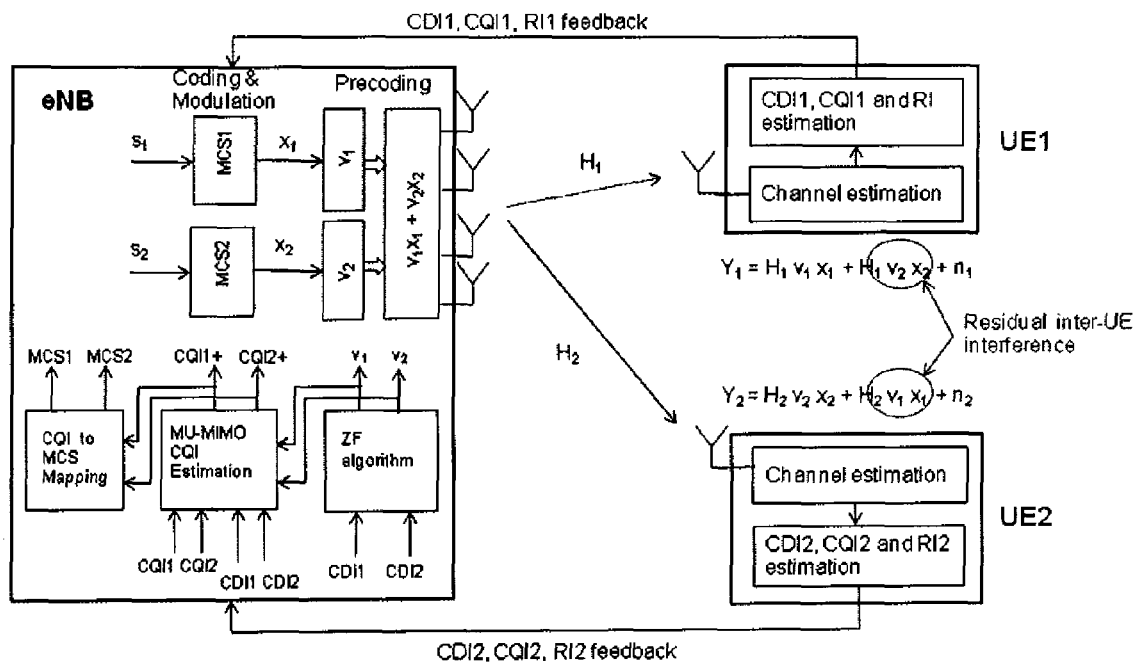
FIG. 1 is a diagram of a MU-MIMO system with CDI and CQI feedback, according to the prior art.
FIG. 2 is a CQI and SINR conversion table for 3GPP LTE, according to the prior art.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present disclosure can decrease the processing needed to find two or more UEs for which multi-user transmissions might be appropriate. The present embodiments can also reduce the overhead needed by the UEs to feed back to an eNB the information the eNB needs to make a decision regarding whether to group the UEs for multi-user transmission.

Multiple input/multiple output (MIMO) techniques have been adopted in advanced wireless systems such as 3GPP LTE and LTE-A as a means to provide a higher data throughput between an eNB and the UEs it serves. In such a system, multiple transmit and multiple receive antennas might be deployed at both the eNB and the UEs, allowing multiple data streams to be transmitted simultaneously between the eNB and a UE using the same resources (in both frequency and time). This can result in a much higher data throughput than a conventional system with a single transmit or receive antenna. This is possible because multiple parallel channels can exist between a UE and an eNB in a MIMO system under a multipath rich propagation environment. The MIMO concept can be applied to scenarios where an eNB could transmit to multiple UEs simultaneously with the same resources when multiple parallel channels exist between the eNB and the UEs.

A MIMO data transmission between an eNB and a single UE is called single user MIMO or SU-MIMO, while a MIMO data transmission between an eNB and multiple UEs is called multi-user MIMO or MU-MIMO. It has been shown that when there are a large number of UEs served by an eNB, MU-MIMO can provide higher sum throughput (the sum of all the UEs' data rates) by scheduling multiple UEs simultaneously on the same time and frequency resources.

For SU-MIMO or MU-MIMO transmissions, especially in a frequency division duplex (FDD) system, the eNB needs feedback from a UE in order to assign the proper precoding matrix and modulation and coding scheme (MCS) levels to subsequent transmissions to the UE. The feedback typically includes, among other parameters, channel direction information (CDI) and a channel quality indication (CQI). Typically, the CDI is quantized at the UE based on a codebook which is known to both the eNB and the UE. The codebook consists of a plurality of codewords, each of which is a representation of the underlying channel. An appropriate codeword is selected to represent the channel, and the index of the codeword, referred to as the precoding matrix indicator (PMI), is fed back to the eNB. The number of bits, B, used for PMI feedback equals $\log_2(N_{CB})$, where $N_{CB}$ is the codebook size. The accuracy of the CDI is in general determined by the codebook size. The eNB uses the CDI or PMI reported by the UE to precode data it transmits to the UE. In some occasions, the eNB may use a different PMI from the PMI it received from the UE to precode data it transmits to the UE.

In other words, after receiving a signal from the eNB, the UE searches through the entire codebook for the codeword that best represents the characteristics of the channel. Each codeword represents a different characterization of the channel, and the more codewords that are present in the codebook, the more accurate the characterization of the channels they represent. The UE selects the most appropriate codeword to represent the channel at that particular moment, finds the index of the selected codeword, and feeds the index back to the eNB as the PMI. The UE also uses the PMI to determine the corresponding CQI and feeds the CQI back to the eNB.

The CQI indicates the expected data rate that can be supported when the codeword corresponding to the reported PMI is used by the eNB for precoding. It is an index to one of the modulation and coding schemes (MCS). The UE typically pairs a PMI and its associated CQI in a feedback transmission to the eNB. The eNB uses the CQI to apply proper channel coding rates and modulation levels to the data it transmits to the UE.

In a MU-MIMO system, the same resources (frequency and time) might be shared by multiple UEs simultaneously to achieve higher total combined throughput or sum rate. The eNB determines which UEs can be scheduled together and share the same resources. To make this decision, the eNB needs to know the CDI from each UE. Such a scheduling decision is referred to herein as a pairing decision, and two or more UEs that share or might potentially share a MU-MIMO transmission are referred to herein as paired UEs or companion UEs.

In a MU-MIMO system, inter-UE interference could occur at the UEs if accurate CDI from each UE is not available at the eNB and the UEs are improperly paired. When the potential interference is not accounted for in UE pairing and code rate assignment, real throughput could be impacted. To prevent these problems, accurate CDI feedback is needed. However, accurate CDI feedback requires more feedback overhead. The trade-off between accurate CDI feedback and feedback overhead becomes a unique challenge for MU-MIMO system designs.

Embodiments disclosed herein deal with pairing PMIs for two or more UEs that might potentially be companion UEs. Methods are also provided for reducing feedback overhead for the PMIs and their associated CQIs. More specifically, a method is provided in which a codebook is divided into multiple predefined subsets, where each subset contains a number of codewords. Each potential SU-MIMO PMI that might be calculated for a first UE is associated with one subset. Each subset contains only the PMIs that are likely to be appropriate for a second UE if the second UE were to act as a companion UE to the first UE and be paired with the first UE in a MU-MIMO transmission. The first UE searches for the most appropriate PMI for the second UE only within the subset that the first UE's SU-MIMO PMI is associated with. The smaller size of the subset compared to the entire codebook results in reduced computation at the first UE in finding the best pairing of its SU-MIMO PMI and a companion PMI for the second UE. Overhead for feeding back the paired PMIs to an eNB is also reduced. The subsets and their contents are known to the eNB, and the eNB identifies the selected subset by the SU-MIMO PMI reported by the UE. The eNB also identifies which PMI within the selected subset was recommended by the UE as the preferred companion PMI. A differential encoding method is provided to encode the corresponding MU-MIMO CQI with a smaller feedback overhead. Furthermore, feedback methods for pairing UEs with mixed ranks and for pairing more than two UEs are presented. Finally, methods for signaling and configuration in support of such feedback methods and reporting schemes are also provided.

A general block diagram of a prior art MU-MIMO system with CDI feedback for two UEs each with one antenna is shown in FIG. 1. The data bits $s_1$ to be sent to UE1 are first coded and modulated at an MCS level of MCS1 and the resulting data symbol $x_1$ is then multiplied with an $N_{Tx} \times 1$ complex precoding vector $v_1$, where $N_{Tx}$ is the number of transmit antennas at the eNB and $N_{Tx}=4$ is shown in the figure. The same process is applied to the data bits $s_2$ which are to be sent to UE2. $H_1$ and $H_2$ are two $1 \times N_{Tx}$ dimensional complex vectors representing the channels between the eNB and UE1 and UE2, respectively. CQI1 and CQI2 are the SU-MIMO CQIs estimated at UE1 and UE2, respectively. CQI1+ and CQI2+ are the new CQIs estimated by the eNB for the two UEs when they are paired in a MU-MIMO scheduling with the precoding vectors $v_1$ and $v_2$, respectively.

The signals received at the two UEs when they are paired in a MU-MIMO scheduling can be expressed mathematically as $$y_1 = H_1 v_1 x_1 + H_1 v_2 x_2 + n_1$$

$$y_2 = H_2 v_1 x_1 + H_2 v_2 x_2 + n_2$$

where $n_1$ and $n_2$ are the receiver noise at the two UEs. $H_1 v_2 x_2$ and $H_2 v_1 x_1$ are the inter-UE interferences at UE1 and UE2, respectively. When perfect CDI information is available at the eNB, the precoding vectors could be obtained using a zero forcing algorithm as follows $$v_1 = \frac{u_1}{\|u_1\|^2},$$

$$v_2 = \frac{u_2}{\|u_2\|^2}$$

where
$[u_1, u_2] = G^H (GG^H)^{-1}$ and $$G = \begin{bmatrix} g_1 \\ g_2 \end{bmatrix}.$$

$g_1$ and $g_2$ are $1 \times N_{Tx}$ vectors derived from CDI1 and CDI2, respectively. For example, $$g_i = \frac{H_i}{\|H_i\|} \quad (i = 1, 2.).$$

$\|\cdot\|$, $(\cdot)^H$ and $(\cdot)^{-1}$ denote matrix two norm, complex conjugate and transpose, and matrix inverse operations, respectively. In this case, the inter-UE interferences are completely removed as $H_1 \cdot v_2 = H_2 \cdot v_1 = 0$, provided that rank $(G) > 1$. Thus, the received signals at the two UEs become $$y_1 = = H_1 v_1 x_1 + n_1$$

$$y_2 = H_2 v_2 x_2 + n_2$$

The resulting MU-MIMO signal and interference to noise ratio (SINR) at UE1 is then $$SINR_1 = \frac{|H_1 v_1|^2 E(|x_1|^2)}{E(|n_1|^2)}$$

where $E(\cdot)$ denotes expectation and $|\cdot|$, the absolute value. $E(|x_1|^2)$ is the transmit power to UE1. With a total transmit power constraint and assuming equal power distribution to the two UEs, $E(|x_1|^2) = P_{Tx}/2$, where $P_{Tx}$ denotes the total transmit power of the eNB.

$SINR_1$ is generally different from the SU-MIMO signal to noise ratio $(SNR_1)$ at UE1, which is given below when $H_1$ is used to precode the data.

$$SNR_1 = \frac{\|H_1\|^2 P_{Tx}}{E(|n_1|^2)}$$

$SNR_1$ is used by UE1 to estimate CQI by using, for example, Table 1 of FIG. 2. Therefore, for MU-MIMO, the eNB could calculate $SINR_1$ based on $g_1$, $v_1$ and $SNR_1$, for example.

$$SINR_1 = \frac{|H_1 \cdot v_1|^2 E(|x_1|^2)}{E(|n_1|^2)} = \frac{|H_1 \cdot v_1|^2}{2\|H_1\|^2} SNR_1 = \frac{\|g_1 v_1\|^2}{2} SNR_1$$

and the eNB uses $SINR_1$ to estimate CQI1+, again based on Table 1, for example.

When quantized versions of $H_1$ and $H_2$, denoted by $\hat{g}_1$ and $\hat{g}_2$, are reported back as CDI1 and CDI2, the resulting zero forcing precoding vectors become $$\hat{v}_1 = \frac{\bar{u}_1}{\|\bar{u}_1\|^2},$$

$$\hat{v}_2 = \frac{\bar{u}_2}{\|\bar{u}_2\|^2}$$

where $[\hat{u}_1, \hat{u}_2] = \hat{G}^H (\hat{G}\hat{G}^H)^{-1}$ and $$\hat{G} = \begin{bmatrix} \hat{g}_1 \\ \hat{g}_2 \end{bmatrix}.$$

The received signals at the UEs are then $$y1 = H_1 \hat{v}_1 x1 + H_1 \hat{v}_2 x_2 + n_1$$

$$y2 = H_2 \hat{v}_1 x1 + H_2 \hat{v}_2 x_2 + n_2$$

Generally, $H_1 \hat{v}_2 \neq 0$ and $H_2 \hat{v}_1 \neq 0$, and thus residual interferences will generally exist at both UE1 and UE2. The amount of interference depends on the CDI accuracy and is generally difficult to predict. Thus, with inaccurate CDI feedback, an eNB generally could not assign a proper MCS to each UE in MU-MIMO, which could result in reduced throughput.

Figure 3:
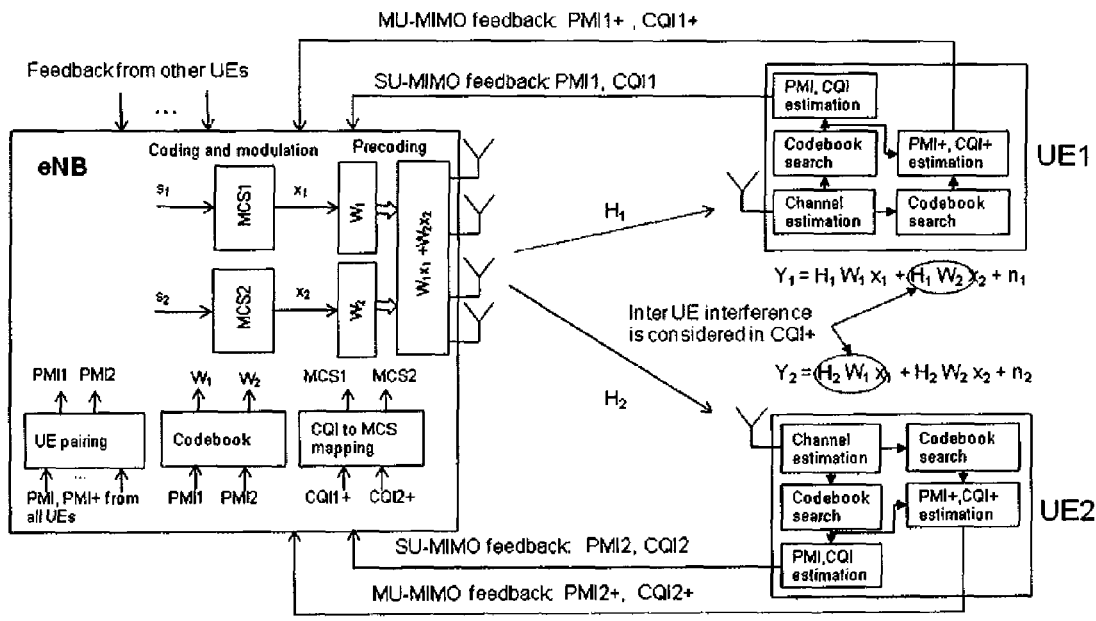
FIG. 3 is a diagram of a MU-MIMO system with a codebook-based pairing of PMI and CQI feedback, according to the prior art.

An existing approach to reduce the inter-UE interference is a codebook-based CDI quantization approach as used in LTE Release 8 (Rel-8), in which the channel of a UE is quantized by using the codewords in the codebook. The index of the codeword with the best representation of the channel is fed back to the eNB as the PMI for SU-MIMO. The corresponding CQI is estimated and fed back with the assumption that the codeword will be used by the precoder in the eNB for SU-MIMO. In addition, the UE looks for the best precoding option in the codebook for its hypothetical paired UE in a MU-MIMO and identifies the codeword that will provide the least amount of interference with that paired UE. The UE then estimates the corresponding CQI by taking into account the inter-UE interference from the paired UE. The codeword index for the potentially paired UE, denoted as PMI+, together with the corresponding CQI, denoted as CQI+, are fed back to the eNB for MU-MIMO UE pairing and scheduling. PMI+ might be referred to herein as a pairing PMI, companion PMI, or potential MU-MIMO PMI, and CQI+ might be referred to herein as a pairing CQI, companion CQI, or MU-MIMO CQI. This MU-MIMO feedback information could be in addition to the SU-MIMO PMI and CQI feedback, such as that defined in LTE Rel-8. Such a MU-MIMO system is shown in FIG. 3. UE1 and UE2 could be paired for MU-MIMO transmission when PMI1=PMI2+ and PMI2=PMI1+. As in FIG. 1, the UEs are selected such that the precoding with codeword $W_1$ and codeword $W_2$ results in less inter-UE interference.

With the existing solutions for pairing PMI and CQI feedback for MU-MIMO, the feedback overhead grows as the codebook size increases. In addition, the existing solutions require a UE to search through the entire codebook to find the best pairing PMI, and this search can be computationally expensive. Also, existing solutions do not provide for pairing of PMI and CQI feedback for MU-MIMO with UEs with different ranks.

Embodiments of the present disclosure can decrease the processing and the feedback overhead for pairing PMI and CQI for MU-MIMO when the codebook is large. Also, methods are provided for pairing of PMI and CQI feedback for MU-MIMO for UEs with mixed ranks of channels and for more than two UEs. In addition, signaling or configuration mechanisms for pairing PMI/CQI feedback are provided. Details of these embodiments will now be provided. In the following discussion, it is assumed that a codebook is used for channel feedback for both SU-MIMO and MU-MIMO.

MU-MIMO with two UEs each having a rank-1 channel will be discussed here, and UEs with channels of mixed ranks will be discussed later. That is, it is assumed here that the number of transmit antennas at the eNB is $N_{Tx}$ and $N_{Tx} \geq 2$, and therefore, the codebook is a rank-1 codebook. In other words, each codeword in the codebook is an $N_{Tx} \times 1$ complex vector.

In an embodiment, to reduce the MU-MIMO PMI feedback overhead, the codebook (CB) is divided into multiple subsets, i.e., $CB = \{CB_0, CB_1, \ldots, CB_{L-1}\}$, where L is the total number of subsets in the codebook, $CB_i = \{W_0^i, W_1^i, \ldots, W_{N_i-1}^i\}$ is the $i^{th}$ subset, $W_n^i \in C^{N_{Tx} \times 1}(\|W_n^i\|^2 = 1)$ is the $n^{th}$ codeword in subset $CB_i$, and $N_i$ is the size of $CB_i$. $C^{N \times M}$ denotes the vector space of $N \times M$ complex matrices.

Each UE calculates its own SU-MIMO PMI and CQI and feeds them back to the eNB. Each SU-MIMO PMI is associated with exactly one subset, but the same subset may be associated with multiple PMIs. The association is predetermined and is known to both the eNB and the UEs served by the eNB. The subsets can be referred to as companion or pairing subsets for the associated SU-MIMO PMIs. For the purpose of selecting the best pairing PMI for MU-MIMO, only the codewords in the companion subset currently associated with a UE's SU-MIMO PMI are searched. The most appropriate PMI in the companion subset is selected, and an index of the selected PMI is then reported back to the eNB. As a result, less processing and feedback overhead are needed compared to the case where the entire codebook is searched. The subset-based MU-MIMO pairing PMI needs only $\log_2(N_i)$ bits for feedback, leading to a saving of $\log_2(N_{CB}) - \log_2(N_i)$ bits compared to the general approach where the pairing PMI is selected over the entire codebook. The size of each subset may be the same or could be different, but is known to both the eNB and the UEs. The codeword arrangement or order in each subset is also known to the eNB and the UEs.

Figure 4:
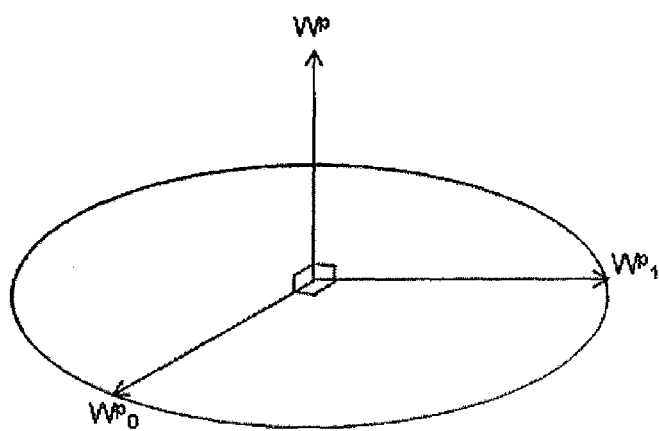
FIG. 4 is an illustration of a companion subset with mutually orthogonal codewords, according to an embodiment of the disclosure.

The determination of which pairing PMIs will comprise which subsets could be done in several different ways. One criterion to construct such subsets is that the codewords in each subset are mutually orthogonal, i.e., $(W_k^i)^H(W_l^i) = 0$, $i = 0, 1, \ldots, L$; $k \neq l$ and k, $l = 0, 1, \ldots, N_i - 1$. A three dimension example is illustrated in FIG. 4, where $W^p$ denotes the codeword indicated by a SU-MIMO PMI and the other two axes represent the members of the subset associated with the SU-MIMO PMI. It can be seen that the SU-MIMO PMI and the other codewords are all orthogonal to one another. In this case, $CB_p = \{W_0^p, W_1^p, W_2^p\}$ and $W_2^p = W^p$.

Figure 5:
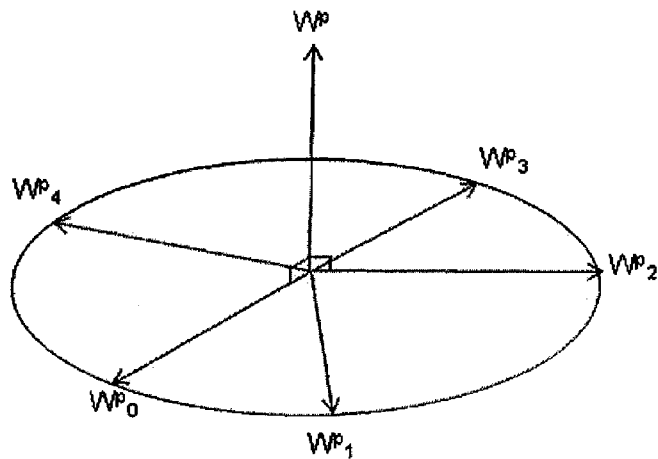
FIG. 5 is an illustration of a companion subset with codewords orthogonal to the codeword indicated by the SU-MIMO PMI, according to an embodiment of the disclosure.

Another criterion could be that for each SU-MIMO PMI, the codewords in the associated subset are all orthogonal to the codeword indicated by the SU-MIMO PMI but are not necessarily orthogonal to one another. That is, for a codeword $W^p \in CB$ and the associated subset $CB_p$, $(W^p)^H(W_l^p) = 0$, $l = 0, 1, \ldots, N_p - 1$. The concept is illustrated in FIG. 5, where $CB_p = \{W_0^p, W_1^p, W_2^p, W_3^p, W_4^p\}$.

Yet another criterion could be that the chordal distances between the codewords in each subset and the associated codeword indicated by the SU-MIMO PMI are greater than a pre-selected value. That is, for a codeword $W^p \in CB$ and the associated subset $CB_p$, $d(W^p, W_l^p) = \sqrt{1 - |(W^p)^H W_l^p|^2} \geq \rho$ for $l = 0, 1, \ldots, N_p - 1$, where $0 < \rho \leq 1$ is the pre-selected value. In other words, the codewords in a companion subset are sufficiently different from the associated SU-MIMO PMI that inter-UE interference is likely to be small in a MU-MIMO transmission to a UE that uses the SU-MIMO PMI while a companion UE uses a PMI from the companion subset.

For a given codebook, the optimal pairing PMI for a UE may not always be within the companion subset. When a less-than-ideal pairing PMI is selected from the companion subset, some performance degradations could occur. To prevent such degradations, the UE could revert to searching through the entire codebook for a pairing PMI. In an embodiment, the eNB can configure a UE to select a MU-MIMO pairing PMI either by searching through the entire codebook or by searching through only the companion subset to balance between performance and feedback overhead. In a specific example, a single flag could be defined. When the flag is set to "1", the entire codebook is used, and the feedback of the pairing PMI uses more bits. When the flag is set to "0", the companion subset is used and less feedback overhead is needed. This flag could be signaled to the UE semi-statically (e.g., via high layer signaling) or dynamically (e.g., via PDCCH). Other examples are also possible to achieve a trade-off between the achieved performance and the signaling overhead reduction.

In an embodiment, for each MU-MIMO pairing PMI, the associated MU-MIMO pairing CQI is calculated and differentially encoded at the UE with respect to the SU-MIMO CQI. That is, the difference is specified between the UE's SU-MIMO CQI and the CQI calculated by assuming it will be paired with the companion UE for MU-MIMO transmission. Two bits should be sufficient for this purpose, which is less than the number of bits that would be needed if the pairing CQI were explicitly specified rather than differentially encoded. The pairing PMI and CQI for MU-MIMO could be reported after each SU-MIMO PMI and CQI report or could be reported after multiple SU-MIMO PMI and CQI reports.

Figure 6:
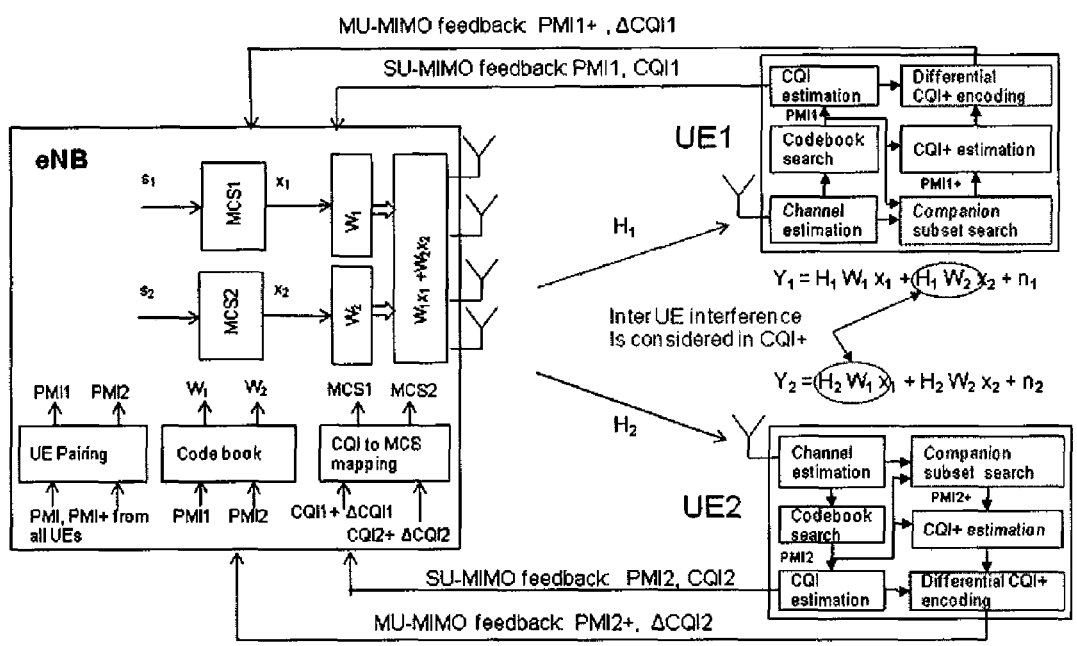
FIG. 6 is a diagram of a MU-MIMO system with reduced overhead for pairing of PMI and CQI feedback, according to an embodiment of the disclosure.

FIG. 6 is a general block diagram of a MU-MIMO system with such a solution, where PMI1+ and PMI2+ indicate the MU-MIMO pairing PMI feedbacks within the companion subsets associated with SU-MIMO PMI1 and PMI2, respectively. $\Delta$CQI1 and $\Delta$CQI2 indicate the differentially encoded MU-MIMO CQI feedbacks associated with PMI1+ and PMI2+, respectively. Two UEs could be paired for MU-MIMO when each UE's SU-MIMO PMI equals the other UE's MU-MIMO pairing PMI.

Examples will now be provided for MU-MIMO feedback for UEs with rank-1 channels. As described above, in addition to SU-MIMO PMI/CQI feedback, a UE could also feed back the best pairing PMI and the associated pairing CQI when configured by an eNB. Using an LTE Rel-8 four Tx antenna rank-1 codebook as an example, the 16 codeword codebook could be partitioned, in one example, into four subsets as follows:

$$CB_1 = \{W_0, W_1, W_2, W_3\}, CB_1 = \{W_4, W_5, W_6, W_7\},$$
$$CB_2 = \{W_8, W_9, W_{10}, W_{11}\},$$
$$CB_3 = \{W_{12}, W_{13}, W_{14}, W_{15}\}$$

where $W_k$ is the codeword associated with PMI=k and k=0, 1, . . . , 15. In this example, the subsets are constructed such that the codewords in each subset are mutually orthogonal and each rank-1 SU-MIMO PMI is associated with one subset. For example, the rank-1 codewords $W_0$, $W_1$, $W_2$ and $W_3$ are all associated with subset $CB_0$. The best pairing PMI could be selected from the subset associated with the reported SU-MIMO PMI. For example, if SU-MIMO PMI=0, then the best pairing PMI could be selected only from subset $CB_0$.

The selected subset is identified by the reported SU-MIMO PMI, and two bits are needed to specify the selected pairing PMI in the subset. This leads to a saving of two bits compared to the case where the paired PMI is selected from the entire codebook. Table 2 of FIG. 7 is an index encoding example for the pairing PMI in the first subset construction example.

In another example, 16 subsets, one for each SU-MIMO PMI, could be constructed with the codebook, as shown in FIG. 8, where the codewords in each subset are orthogonal to the associated SU-MIMO codeword. In this example, SU-MIMO PMI=k is associated with subset $CB_k$ and the size of each subset is not the same.

The best pairing PMI selection criterion at a UE could be to maximize the received SINR or could be some other criterion. The associated CQI is calculated based on the resulting SINR by assuming that the reported SU-MIMO PMI is used for precoding the data for the UE and the pairing PMI is used to precode the data for another UE paired together in MU-MIMO transmission.

The CQI associated with the pairing PMI could be encoded either explicitly or implicitly. In the case of explicit encoding, four bits are required to represent different levels of CQI in LTE. In the case of implicit encoding, a set of CQI offsets, i.e., the differences between the MU-MIMO CQIs and the SU-MIMO CQI, are encoded. An example is shown in Table 3 of FIG. 7, where two bits are used for this purpose. It should be noted that, as MU-MIMO CQI is always smaller than SU-MIMO CQI (assuming a large CQI is associated with a large SINR) due to the fact that interference from other users has to be taken into account and the transmission power is shared between the two UEs, the offset between MU-MIMO CQI and SU-MIMO CQI will take negative values as shown in the table. In such a case, a total of four bits are needed: two bits for the pairing PMI and two bits for the associated CQI feedback.

The above discussion has dealt with MU-MIMO feedback for UEs with rank-1 channels. The concept is extended here to the cases where two UEs with different channel ranks participate in MU-MIMO scheduling. For example, a rank-1 UE and a rank-2 UE could be paired for MU-MIMO if $N_{Tx} \geq 3$. In this case, the rank-2 codebook could be divided into subsets such that each rank-1 SU-MIMO PMI is associated with one of the subsets of rank-2 codewords. Similarly, each rank-2 SU-MIMO codeword could be associated with a subset of rank-1 codewords. In such scenarios, the subsets are generally smaller than the full MU-MIMO codebook size, and thus a smaller MU-MIMO feedback overhead could be achieved.

A UE with a rank-p channel reports a SU-MIMO PMI based on the code book $CB^p$, where $CB^p$, $1 \leq p \leq N_{Tx}$, is the rank-p code book. For MU-MIMO, the UE could feed back up to $N_{Tx}-p$ different rank MU-MIMO pairing PMIs by searching through the codebooks $CB^m$, $1 \leq m \leq N_{Tx}-p$, where m can be pre-defined or it can be a user-specific value. The eNB could limit the range of m for MU-MIMO reporting purposes for a specific UE, for a group of UEs, or for all UEs.

To reduce feedback overhead, each codebook $CB^m$ could be divided into subsets for each SU-MIMO channel rank p. That is, $$CB^m = \{CB_0^m(p), \ldots, CB_{L_m-1}^m(p)\}, p1,2,\ldots,N_{Tx}$$

where $CB_i^m(p) = \{W_{i,0}^m(p), \ldots, W_{i,N_{i,m}}^m(p)-1(p)\}$, $i=0, 1, \ldots, L_m-1$ is the $i^{th}$ companion subset in a rank-m codebook for a rank-p SU-MIMO PMI, and $W_{i,k}^m(p) \in C^{N_{Tx} \times m}$, $k=0, 1, \ldots, N_{i,m}(p)-1$ is the $k^{th}$ codeword in the $CB_i^m(p)$, $L_m$ is the number of subsets, and $N_{i,m}(p)$ is the size of the subset $CB_i^m(p)$.

Similar to the case discussed in the rank-1 companion subset construction, the subsets could be constructed with a number of different criteria. One could be that the codewords in each subset $CB_i^m(p)$ are orthogonal to a rank-p codeword indicated by a SU-MIMO PMI. That is, for a codeword $W^i \in CB^p$ and the associated subset $CB_i^m(p)$, $(W^i)^H(W_{i,l}^m(p)) = 0$, $l=0, 1, \ldots, N_{i,m}(p)-1$. Another criterion could be that the codewords in each subset $CB_i^m(p)$ have a chordal distance to the associated rank-p SU-MIMO codeword greater than a pre-selected value. That is, for a codeword $W^i \in CB^p$ and the associated subset, $$d(W^i, W_{i,l}^m) = \|W^p(W^p)^H - W_{i,l}^m(p)(W_{i,l}^m(p))^H\|_F \geq \mu \text{ for } l=0,1,\ldots,N_{i,m}(p)-1,$$

where $\|\cdot\|_F$ denotes the matrix Frobenius norm and $0 < \mu \leq 1$ is the preselected value.

Each subset could be associated with one or multiple rank-p SU-MIMO PMIs. For a given subset construction, each companion subset size could be the same or could be different, but the size is known to both the eNB and the UEs. Instead of reporting the MU-MIMO pairing PMIs by searching through the entire MU-MIMO codebook, a UE could search through the companion subsets associated with the reported rank-p SU-MIMO PMI and feed back only the codeword index or indices within a subset or subsets. As a result, the feedback overhead could be reduced.

For each MU-MIMO pairing PMI, the associated MU-MIMO pairing CQI could be calculated and differentially encoded at the UE with respect to the most recently reported SU-MIMO CQI. In one scenario, a UE could report all the pairing PMIs and CQIs, one from each of its companion subsets of the same or different ranks. For example, a rank-1 UE could report a pairing PMI and CQI from each of its rank-1 to rank-3 companion subsets. In another scenario, a UE could merely report the pairing PMI and CQI from a particular companion subset, e.g., a rank-1 companion subset. In yet another scenario, a UE could report multiple PMIs and CQIs only from its rank-1 companion set, and the eNB could derive from the feedback a higher rank pairing PMI and the associated CQI. In still another scenario, a UE could report only a CQI that is a function of the CQIs of all the possible pairing PMIs in the rank-1 subset, such as the average pairing CQI or some other function of the CQIs. The eNB could estimate the higher rank pairing PMIs and CQIs from these lower rank feedbacks.

Examples will now be provided for MU-MIMO feedback for UEs with channels of mixed ranks. In a real system, different UEs could have channels with different ranks, and there should be some flexibility to allow such UEs to be paired in MU-MIMO transmission. For example, a UE with a rank-1 channel could be paired with a UE with a rank-2 channel. In such a situation, a rank-1 UE could report, as requested by the eNB, the best MU-MIMO pairing PMI and CQI by assuming that the UE would be paired with a rank-2 UE. Instead of searching through all the rank-2 codewords in a rank-2 codebook, only a subset of the codebook could be used to reduce both the PMI feedback overhead and the UE codebook searching computation. Similarly, for a UE that can be assigned as a rank-2 transmission, only a subset of the rank-1 codebook needs to be searched.

FIG. 9 shows an example for such a subset construction based on an LTE Rel-8 codebook with four antennas. The subsets of the rank-2 codebook, i.e., $CB^2 = \{CB_0^2(p=1), \ldots, CB_{15}^2(p=1)\}$ for MU-MIMO PMI feedback by a UE with rank-1 SU-MIMO PMI are shown in FIG. 9a, where rank-1 SU-MIMO PMI=k (k=0, 1, \ldots, 15) is associated with subset $CB_k^2(p=1)$. The subsets are constructed such that the codewords in each subset are orthogonal to the associated rank-1 SU-MIMO codeword. Similarly, the subsets of a rank-1 codebook for MU-MIMO PMI reporting by a UE with rank-2 SU-MIMO PMI are shown in FIG. 9b. The subsets are similarly constructed with the codewords in each subset orthogonal to the associated rank-2 SU-MIMO codeword. With these companion subsets, the selection of the pairing PMI in such subsets could be restricted. This could lead to reduced signaling overhead without overly compromising the MU-MIMO performance.

For the subsets shown in FIG. 9, the subset size is either one or two. A rank-1 UE needs to search only up to two rank-2 codewords in the subset associated with its SU-MIMO PMI. For example, a rank-1 UE with SU-MIMO PMI=0 needs to search only over the rank-2 codewords indicated by PMI=2 and PMI=10 for its best pairing rank-2 PMI. Similarly, a rank-2 UE needs to search only up to two rank-1 codewords. For instance, a rank-2 UE with SU-MIMO PMI=1 needs to search only over rank-1 codewords associated with PMI=3 and PMI=11. One bit is needed for the pairing PMI in this example.

Examples of subset construction for the cases of pairing a rank-1 UE with a rank-3 UE and pairing a rank-2 UE with another rank-2 UE using an LTE Rel-8 codebook are shown in FIG. 10 and FIG. 11. In both cases, there is only one pairing candidate in the companion subset for each SU-MIMO PMI, and therefore no MU-MIMO PMI feedback is needed. In other words, the MU-MIMO PMI feedback is predefined. It should be noted that in these examples, some subsets are empty, and in these cases, MU-MIMO pairing is not possible.

For a system with $N_{Tx}=4$ transmit antennas, a rank-1 UE could be configured by the eNB to report a pairing PMI for pairing with a rank-1 UE, with a rank-2 UE, with a rank-3 UE, or all of the above. Similarly, a rank-2 UE could be configured to report a pairing PMI for pairing with a rank-1 UE, with a rank-2 UE, or both. A rank-3 UE needs to report a pairing PMI only for pairing with a rank-1 UE.

When the codebook has a nested structure, i.e., a lower rank codeword is a subset of a higher rank codeword with the same PMI, the higher rank PMI and CQI could be derived from the lower rank PMIs and CQIs.

For MU-MIMO CQI encoding, a rank-p UE needs to report up to p pairing CQIs for each pairing PMI, one for each layer. Each of the MU-MIMO CQIs can be differentially encoded with two bits, for example, as discussed previously, where the CQI offsets relative to the corresponding SU-MIMO CQI are calculated and reported.

The concepts described above can be extended to support MU-MIMO pairing with more than two UEs. In such a case, a UE could search over the companion subset with the assumption that pairing might occur with more than two UEs with PMIs in that companion subset. Two or more pairing PMIs might then be selected from the companion subset. For example, the first, second, and third best pairing PMIs may be selected. The selected pairing PMIs and their associated CQIs could then be fed back to the eNB to facilitate MU-MIMO pairing with more than two UEs.

Providing more than one pairing PMI to the eNB can increase the pairing probability, but can also increase the feedback overhead. When the subset size is small, feeding back only the pairing CQIs for all the codewords in a subset could result in less feedback overhead, because the pairing PMIs can be implicitly derived at the eNB and need not to be reported in this case.

With multiple pairing PMIs available, the eNB could have the flexibility of pairing more than two UEs for MU-MIMO scheduling. However, the eNB may not always be able to find a UE pair for MU-MIMO scheduling based on the best pairing PMI and CQI reported by a UE. In an embodiment, if a companion UE is present that has a PMI equal to the best pairing PMI reported by a first UE, and if MU-MIMO transmission is appropriate for the two UEs, the eNB pairs the two UEs. If the first UE has reported more than one pairing PMI, and if no companion UE was present that had a PMI equal to the best pairing PMI reported by the first UE but a companion UE was present that did have a PMI equal to the second best pairing PMI reported by the first UE, then only the first UE and the second companion UE would be paired if MU-MIMO transmission is appropriate for the two UEs. If a companion UE was present that did have a PMI equal to the best pairing PMI reported by the first UE and another companion UE was present that did have a PMI equal to the second best PMI reported by the first UE, then the first UE and the first and second companion UEs would be paired. (As used herein, the term "pairing" might refer to the grouping of more than two UEs.) A similar procedure is then followed for all of the pairing PMIs reported by the first UE.

Details of this procedure are now provided. When a UE, denoted as UE0, is paired with another UE, denoted as UEk, in MU-MIMO scheduling, the received signal at UE0 can be expressed mathematically as $$y = H_0 v_0 x_0 + H_0 v_k x_k + n$$

where $y \in C^{M \times 1}$ is the received signal, M is the number of receive antennas, $H_0 \in C^{M \times N_{Tx}}$ is the channel matrix of UE0, $v_0 \in C^{N_{Tx} \times 1}$ is the precoding vector applied to $x_0$, $x_0$ is a data symbol transmitted to UE0, $v_k \in C^{N_{Tx} \times 1}$ is the precoding vector applied to $x_k$, $x_k$ is the data symbol for UEk, and $n \in C^{M \times 1}$ is the white receive noise at UE0. With a maximum ratio combing (MRC) receiver, the received signal y is combined as follows $$z = r^H y = \|H_0 v_0\| x_0 + \frac{(H_0 v_0)^H H_0 v_k}{\|H_0 v_0\|} x_k + \frac{(H_0 v_0)^H n}{\|H_0 v_0\|}$$

$$\text{where } r = \frac{H_0 v_0}{\|H_0 v_0\|}.$$

The SINR at UE0 is then given by $$SINR_k^2 = \frac{\|H_0 v_0\|^2 E(|x_0|^2)}{\sigma_n^2 + \frac{|(H_0 v_0)^H H_0 v_k|^2}{\|H_0 v_0\|^2} E(|x_k|^2)} = \frac{\sigma_s^2}{\sigma_n^2 + \sigma_k^2}$$

where $\sigma_s^2 = \|H_0 v_0\|^2 E(|x_0|^2)$ is the received signal power, $$\sigma_k^2 = \frac{|(H_0 v_0)^H H_0 v_k|^2}{\|H_0 v_o\|^2} E(|x_k|^2)$$

is the interference power, and $\sigma_n^2 = E(|n|^2)$ is the noise power. For equal transmit power distribution among the paired UEs and under a total power constraint, $E(|x_0|^2) = E(|x_k|^2) = P_{Tx}/2$, where $P_{Tx}$ is the total transmit power. Thus the SINR at UE0 is uniquely determined by $H_o$ and the precoding vectors, $v_o$ and $v_k$. The corresponding pairing CQI at UE0 could be obtained through a mapping table such as the one shown in Table 1 of FIG. 2 and reported back to the eNB.

When UE0 is paired with another (K−1) UEs in a MU-MIMO, the signals received at UE0 can be expressed as $$y = H_0 v_0 x_0 + \sum_{k=1}^{K-1} H_0 v_k x_k + n$$

The SINR at UE0 in this case becomes $$SINR^K = \frac{\sigma_s^2}{\sigma_n^2 + \sum_{k=1}^{K-1} \sigma_k^2}$$

It should be noted that $$E(|x_0|^2) = E(|x_k|^2) = \frac{P_{Tx}}{K} (k = 1, \ldots, K-1)$$

in this case under the assumption of equal power distribution and total power constraint. It can be shown that $$SINR^K = \frac{1}{\sum_{k=1}^{K-1} \frac{1}{SINR_k^2} - \frac{(K-2)}{SNR_{SU-MIMO}}}$$

where $$SNR_{SU-MIMO} = \frac{\|H_0 v_0\|^2 P_{Tx}}{\sigma_n^2}$$

is the SU-MIMO SNR, which could be obtained from the SU-MIMO CQI through a mapping table such as the one shown in Table 1. Therefore, with SU-MIMO CQI and (K−1) two-UE pairing CQI available, the eNB could calculate the pairing CQI for MU-MIMO scheduling with more than two UEs. When the actual transmission power to each UE participating in a MU-MIMO is not equally distributed, the equation can be modified accordingly.

Figure 12:
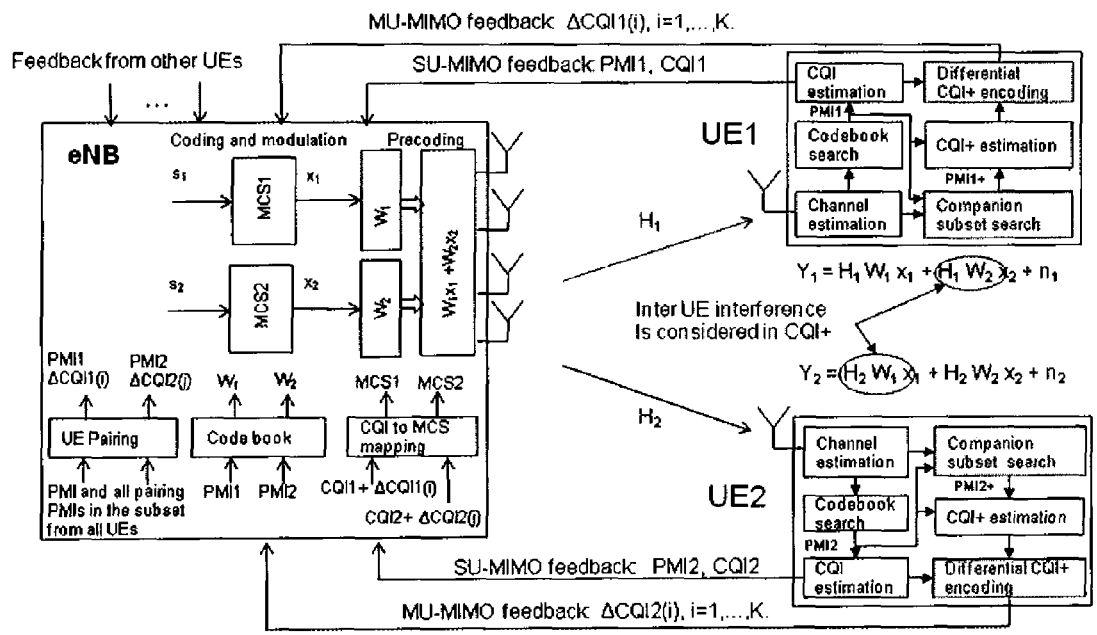
FIG. 12 depicts a MU-MIMO system with feedback of multiple paired CQIs, according to an embodiment of the disclosure.

FIG. 12 shows such a scheme where pairing with only two UEs is shown. Each UE feeds back all the differentially encoded pairing CQIs, $\Delta CQI(i)$, i=1, ..., K−1 within its companion subset. At the eNB, the pairing PMIs of each UE are identified by the $\Delta CQI$ sequence and the companion subset. For each UE's SU-MIMO PMI, the eNB searches through the pairing PMIs reported by all the UEs. If a pairing PMI associated with $\Delta CQI2(i)$ reported by UE2 is equal to the SU-MIMO PMI of UE1 and if, at the same time, UE2's SU-MIMO PMI equals the pairing PMIs associated with $\Delta CQI1(j)$ reported by UE1, then the two UEs could be paired for MU-MIMO. The MU-MIMO CQI for UE1 is then CQI1+$\Delta CQI1(j)$, and similarly CQI2+$\Delta CQI2(i)$ for UE2.

Examples are now provided for MU-MIMO feedback for efficient pairing of multiple UEs with rank-1 channels. Considering the first example discussed previously with four transmit antennas and LTE Rel-8 codebooks, each subset contains four mutually orthogonal codewords. Each UE could calculate and report the MU-MIMO CQIs for all three potential pairing PMIs within its companion subset. The corresponding pairing PMIs could be identified at the eNB by a pre-determined reporting structure, and thus feedback of the pairing PMIs is not required.

Two such possible structures are shown in Table 4 and Table 5 of FIG. 7. For a given SU-MIMO PMI in column 1, the numbers in columns 2, 3, and 4 at the same row as the SU-MIMO PMI are the pairing PMIs associated with the reported MU-MIMO CQIs. For example, for SU-MIMO PMI=0, the first MU-MIMO CQI feedback $\Delta CQI(1)$ corresponds to companion PMI=1 if Table 4 is used, and the second MU-MIMO CQI feedback $\Delta CQI(2)$ corresponds to companion PMI=2, and so on.

Each MU-MIMO CQI could be differentially encoded with respect to the SU-MIMO CQI as shown in Table 3. Thus, only six bits (=2×3) are needed, a saving of two bits compared to reporting two pairing PMIs and CQIs.

With all three pairing CQIs available, the eNB has the flexibility of performing MU-MIMO with the second or the third best pairing PMI when a UE with the best pairing PMI is not present, provided that the pairing with the second or third best pairing PMI would still provide higher sum throughput than that of SU-MIMO.

In addition, the eNB can pair more than two UEs to further improve cell throughput. This is possible because the MU-MIMO CQI with more than two UEs can be derived from the UE reported pairing MIMO CQIs when either a single antenna is equipped at the UEs or an MRC type of receiver is assumed in the pairing CQI calculation.

$SNR_{SU-MIMO}$- and $SINR_k^2$ can be derived from the UE's reported SU-MIMO CQI and the pairing CQIs, respectively. Using 3GPP LTE as an example, for a given reported CQI the corresponding SINR can be obtained by looking up Table 1 in FIG. 2. For example, if the feedback SU-MIMO CQI=15 and the pairing CQIs are {13, 12, 11}, then $SNR_{SU-MIMO}$=19.49 dB and $SINR_{k=1, 2, 3}^2$={(15.70, 13.81, 11.92} dB. The SINR at UE0 when paired with the first two UEs, i.e., with PMIs associated with the MU-MIMO CQIs {13, 12}, can be calculated as follows $$SINR^{K=3} = \frac{1}{10^{-\frac{15.7}{10}} + 10^{-\frac{13.81}{10}} - 10^{-\frac{19.49}{10}}} = 17.46 \text{ (or } 12.42 \text{ dB)}$$

The corresponding MU-MIMO CQI=11 can be obtained from the Table 1.

Similarly, the eNB can also calculate the MU-MIMO SINR when UE0 is paired with all three UEs, i.e., $$SINR^{K=4} = \frac{1}{10^{-\frac{15.7}{10}} + 10^{-\frac{13.81}{10}} + 10^{-\frac{11.92}{10}} - 2 \times 10^{-\frac{19.49}{10}}}$$
$$= 9.067 \text{ (or } 9.57 \text{ dB)}$$

The corresponding MU-MIMO CQI=9 can be obtained from Table 1.

Techniques for specifying how a pairing PMI and pairing CQI are to be reported will now be discussed. In an embodiment, the MU-MIMO pairing PMI and CQI reporting is configured by the eNB and signaled to the UE. Such a configuration could be semi-static and UE-specific. The configuration could be also cell-specific and indicated via the broadcast control channel. The eNB could change configurations depending on the traffic load of the system. Each configuration could include feedback attributes such as feedback methods, rank restriction, and feedback duration. The pairing PMI and CQI feedback is in addition to Rel-8 PMI and CQI feedback. Such new feedback could be configured to transmit on the PUSCH (Physical Uplink Shared Channel) in an aperiodic manner, on the PUCCH (Physical Uplink Control Channel) in a periodic manner, or both.

Examples will now be provided for the configuration of pairing PMI and CQI reporting. By default, a Release 10 (Rel-10) (LTE-A) UE could still feed back Rel-8 PMI and CQI. The additional MU-MIMO pairing PMI and CQI feedback as discussed above could be configured by the eNB. Such configuration could be signaled to the UE semi-statically through high-layer dedicated signaling such as RRC (Radio Resource Control) or Medium Access Control (MAC) control elements. The content of such configuration could be for a specific UE, a group of UEs, or all the UEs in a cell served by the eNB. The UE, in certain scenarios, could also explicitly ask the eNB to request certain configurations. Multiple companion structures could be supported and the particular structure to be used could be signaled to the UEs.

The UE could report MU-MIMO pairing PMIs and CQIs assuming that it could be paired with K other UEs by the eNB, where K=1, 2, ..., $N_{Tx}-1$ could be configured by the eNB and signaled to the UEs. In another alternative, the number of UEs assumed to be paired could simply be preset by the standards. The UE could report only MU-MIMO pairing PMIs and CQIs for paired UEs within the restricted rank(s) or codewords. For example, a UE could be configured to report pairing PMIs and CQIs with another UE or UEs with channel ranks from 1 to p, where p is configurable and could be signaled to the UEs. Such restriction may not be related to the rank and codeword restriction for Rel-8 PMI and CQI reporting and could be independent from the rank reporting of Rel-8. Also, instead of sending pairing PMI or CQIs, a function of the pairing CQIs in the companion subset, such as averaging or the minimum could be reported to reduce more overhead. The UE could be configured by the eNB to periodically report pairing PMI and CQI, and the reporting frequency could be configured. The duration of the report could also be configured by the eNB. If such a parameter is not specified, the UE could change the reporting configuration only after receiving a new reporting configuration. As an alternative to periodic (e.g., timer based) reporting, aperiodic reporting could be used. For example, reporting could be event-driven based on an event such as an eNB request, or reporting could occur only if the values have changed since last report.

The eNB could configure the UEs to feed back multiple pairing PMIs and CQIs from the same subset. That is, in addition to the best pairing PMI, the second best or the third best pairing PMIs could also be reported. The eNB could derive, for example, a rank-2 report from a rank-1 report or vice versa.

The eNB could decide the reporting configuration based on considerations such as traffic loading, the number of UEs to be scheduled, and the CQI indication. For example, if the eNB has very few UEs to support, or in a so-called low-load situation, it could configure the UEs to report only Rel-8 PMI and CQI and therefore schedule only SU-MIMO. In another scenario, if the eNB has a large number of UEs to support in a cell, or in a so-called high load situation, and the eNB has a high correlation antenna configuration, it could configure the UE to feed back a rank-1 pairing PMI and the corresponding CQI, and therefore, it could schedule two or multiple UEs in a rank-1 MU-MIMO transmission. In yet another scenario, if the eNB has to support some UEs with LOS and, at the same time, support other UEs with rich scattering channels, it could configure the former UEs to feed back rank-1 pairing PMI and CQI, and configure the latter UEs with high rank pairing PMI and CQI. This could lead to the pairing of such UEs in MU-MIMO with different rank transmission.

Even with configuration of the pairing PMI and CQI reporting, the UE follows the configuration and reports required by the eNB. The eNB could still override the reported pairing PMI, CQI, and rank based on other considerations. For example, the eNB could configure the UE to report rank-2 paring PMI and CQI; however, the eNB could still pair UEs in rank-1 MU-MIMO transmission by utilizing some of the feedback information. The eNB could also choose a different PMI than the one reported in MU-MIMO based on other information and considerations. Since a demodulation reference signal (DM-RS) is adopted in Rel-10 for PDSCH (Physical Downlink Shared Channel) demodulation, such a change is unlikely to introduce any issue.

Details are now provided regarding the benefits that might be gained by adopting the techniques described herein. If the total available eNB Tx power is unchanged, the Tx power to each UE could be reduced by 3 dB when two UEs are paired for MU-MIMO with equal power. Thus, the SNR for each UE is reduced automatically by 3 dB compared to the SU-MIMO case. Therefore, the bit rate for each UE in a MU-MIMO transmission is always less than the corresponding SU-MIMO case, and so the offset is always a negative number. In Rel-8, the minimum SNR difference between two adjacent CQI indices is about 2 dB, and thus the minimum MU-MIMO CQI offset is −1.

Figure 13:
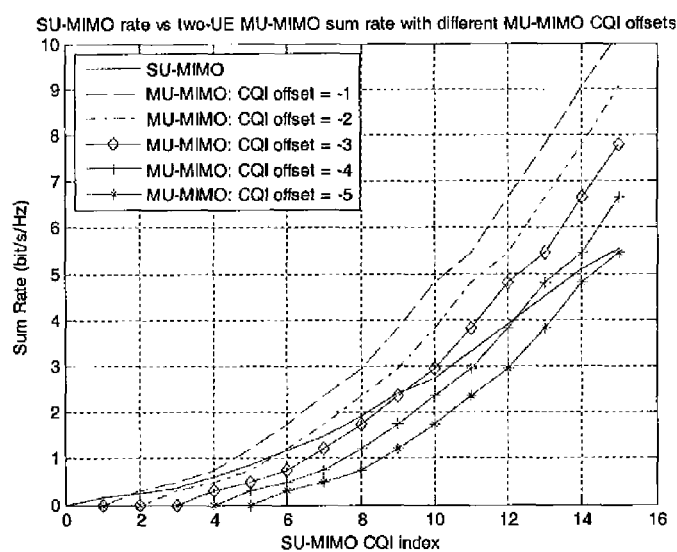
FIG. 13 depicts a graph of SU-MIMO vs. two-UE MU-MIMO throughput with different MU-MIMO CQI offsets, according to an embodiment of the disclosure.

In addition, assuming equal power transmission, the MU-MIMO sum rate vs. the SU-MIMO rate is shown in FIG. 13. It can be seen that there is no MU-MIMO gain at CQI offset=−5. Therefore, the two-bit encoding of the MU-MIMO CQI shown in Table 3 is justified.

The MU-MIMO region where the MU-MIMO sum rate is expected to outperform the SU-MIMO rate is shown in Table 6 of FIG. 14, where the same SU-MIMO CQI and MU-MIMO CQI offset are assumed for the two paired UEs. Clearly, the MU-MIMO gain only occurs at certain combinations of SU-MIMO CQI and MU-MIMO CQI offset. For example, for SU-MIMO CQI below 6, MU-MIMO gain occurs only at MU-MIMO CQI offset=−1. For a given SU-MIMO CQI and a MU-MIMO CQI offset, the table can be used by the eNB to determine if MU-MIMO is feasible to provide a higher cell throughput.

Figure 15:
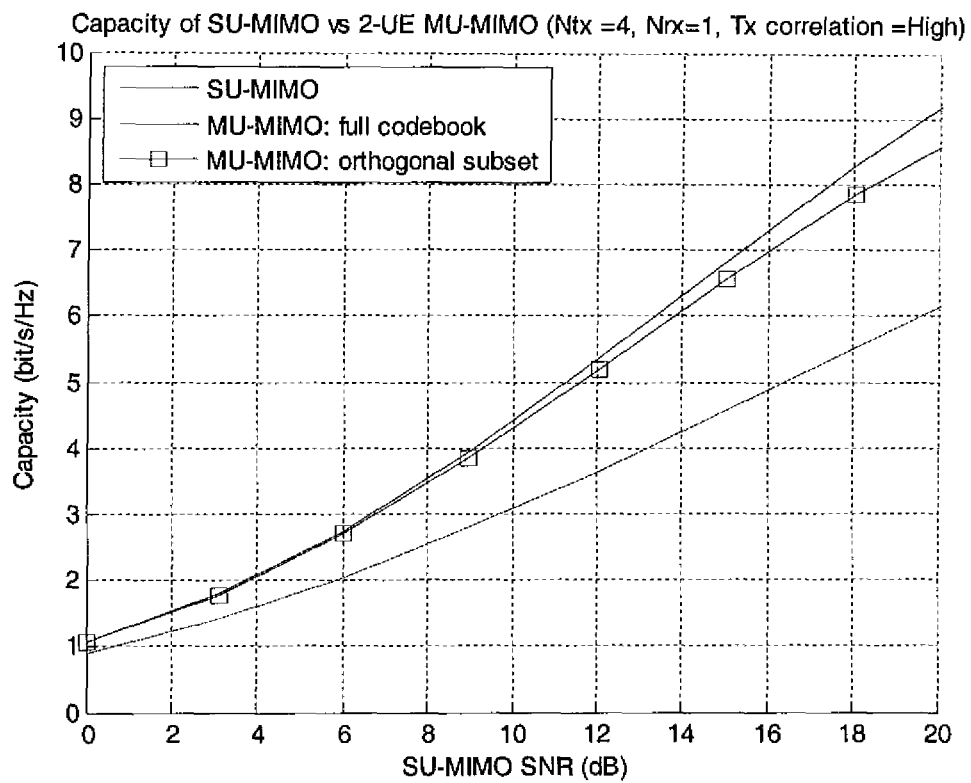
FIG. 15 depicts a graph of sum capacity of MU-MIMO vs. SU-MIMO under a high correlated Gaussian channel, according to an embodiment of the disclosure.
Figure 16:
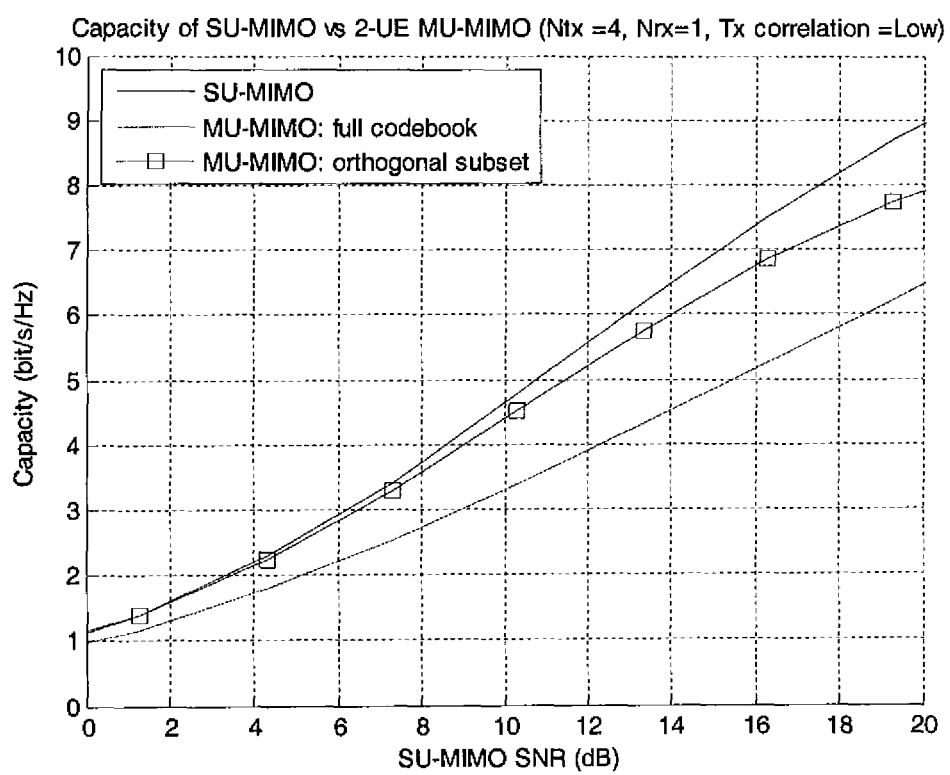
FIG. 16 depicts a graph of sum capacity of MU-MIMO vs. SU-MIMO under a white Gaussian channel, according to an embodiment of the disclosure.

In the following, the performance of the pairing PMI selection method is studied using the Rel-8 codebook and with four transmit antennas at the eNB and a single receive antenna at the UE. The capacity degradation of such a feedback compared to the feedback with the full codebook is shown in FIG. 15 for a highly correlated channel and in FIG. 16 under an uncorrelated channel, where for a given channel realization it is assumed that a companion UE with the pairing PMI is always present and has the same MU-MIMO CQI. It can be seen that the degradation is quite small in the high correlation case, while it is slightly larger in the uncorrelated case. The worst case capacity loss occurs at the highest SU-MIMO SNR=20 dB and is less than 5% in the high correlated channel case and less than 12% in the uncorrelated channel case.

Figure 17:
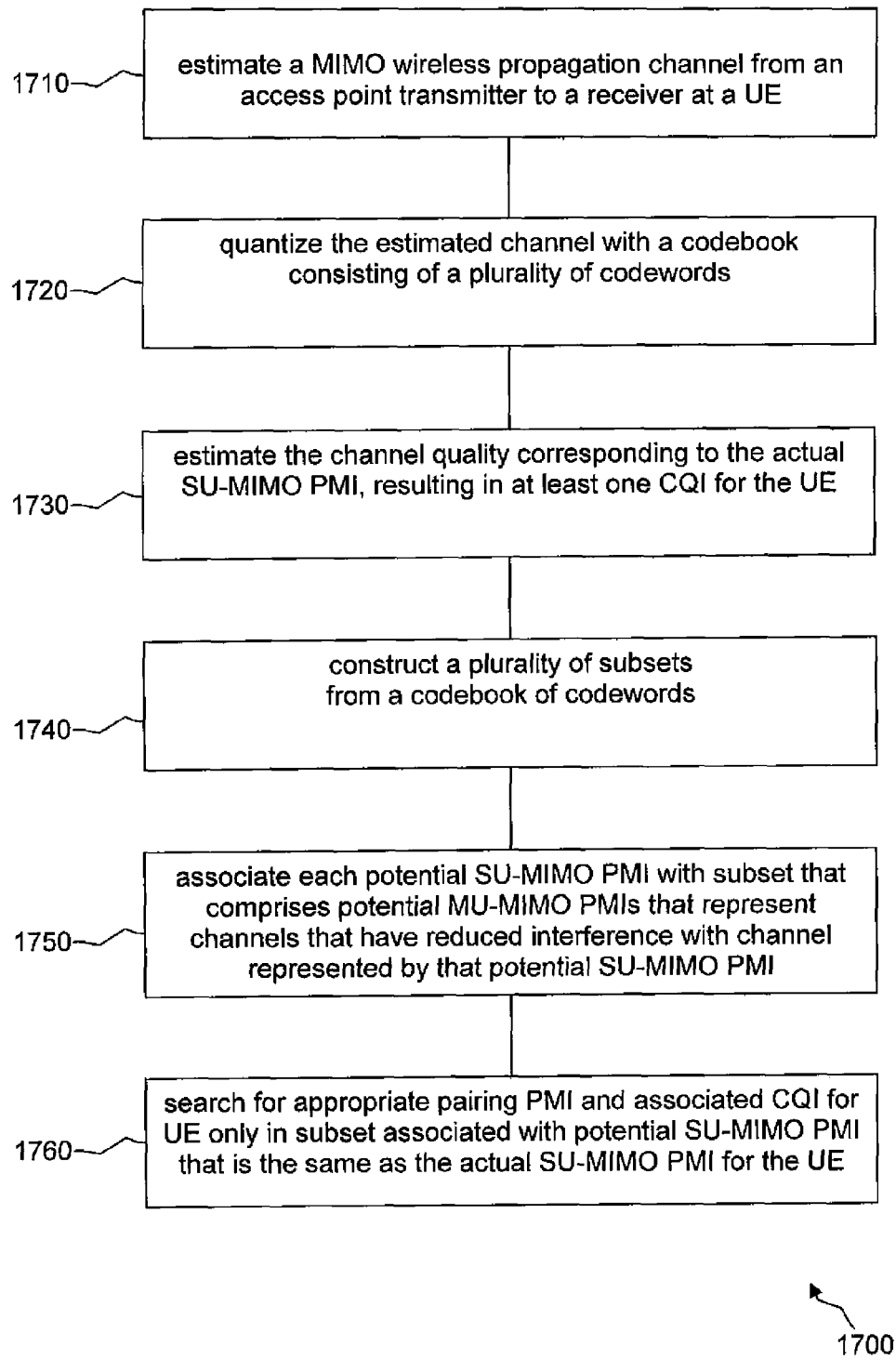
FIG. 17 illustrates an embodiment of a method for communication in a wireless telecommunications system, according to an embodiment of the disclosure.

FIG. 17 illustrates an embodiment of a method 2200 for searching for a pairing PMI. At block 1710, a MIMO wireless propagation channel from an access point transmitter to a receiver at a UE is estimated. At block 1720, the estimated channel is quantized with a codebook consisting of a plurality of codewords. The quantization result is an actual SU-MIMO PMI currently applicable to the UE. At block 1730, the channel quality corresponding to the actual SU-MIMO PMI is estimated. This results in at least one CQI for the UE. At block 1740, a plurality of subsets are constructed from a codebook of codewords. Each subset comprises potential MU-MIMO PMIs that represent channels that have reduced interference with a channel represented by one of the potential SU-MIMO PMIs. At block 1750, each potential SU-MIMO PMI is associated with the subset that comprises the potential MU-MIMO PMIs that represent channels that have reduced interference with the channel represented by that potential SU-MIMO PMI. At block 1760, a search is performed for an appropriate pairing PMI and the associated CQI for the UE only in the subset associated with the potential SU-MIMO PMI that is the same as the actual SU-MIMO PMI for the UE.

Figure 18:
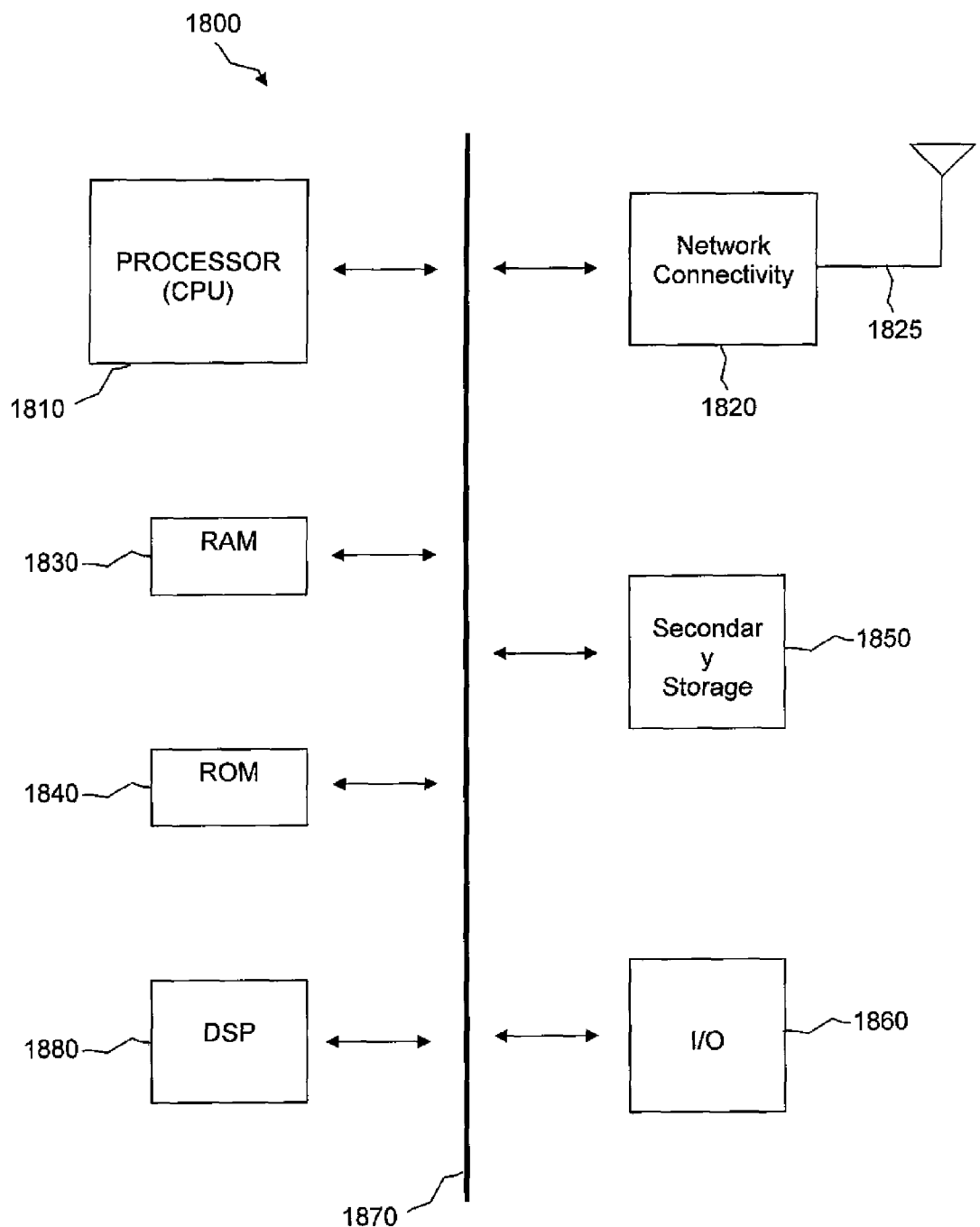
FIG. 18 illustrates a processor and related components suitable for implementing the several embodiments of the present disclosure.

The UE, eNB, and other components described above might include a processing component that is capable of executing instructions related to the actions described above. FIG. 18 illustrates an example of a system 1800 that includes a processing component 1810 suitable for implementing one or more embodiments disclosed herein. In addition to the processor 1810 (which may be referred to as a central processor unit or CPU), the system 1800 might include network connectivity devices 1820, random access memory (RAM) 1830, read only memory (ROM) 1840, secondary storage 1850, and input/output (I/O) devices 1860. These components might communicate with one another via a bus 1870. In some cases, some of these components may not be present or may be combined in various combinations with one another or with other components not shown. These components might be located in a single physical entity or in more than one physical entity. Any actions described herein as being taken by the processor 1810 might be taken by the processor 1810 alone or by the processor 1810 in conjunction with one or more components shown or not shown in the drawing, such as a digital signal processor (DSP) 1880. Although the DSP 1880 is shown as a separate component, the DSP 1880 might be incorporated into the processor 1810.

The processor 1810 executes instructions, codes, computer programs, or scripts that it might access from the network connectivity devices 1820, RAM 1830, ROM 1840, or secondary storage 1850 (which might include various disk-based systems such as hard disk, floppy disk, or optical disk). While only one CPU 1810 is shown, multiple processors may be present. Thus, while instructions may be discussed as being executed by a processor, the instructions may be executed simultaneously, serially, or otherwise by one or multiple processors. The processor 1810 may be implemented as one or more CPU chips.

The network connectivity devices 1820 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1820 may enable the processor 1810 to communicate with the Internet or one or more telecommunications networks or other networks from which the processor 1810 might receive information or to which the processor 1810 might output information.

The network connectivity devices 1820 might also include one or more transceiver components 1825 capable of transmitting and/or receiving data wirelessly on a plurality of antennas in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1825 might include separate receiving and transmitting units or a single transceiver. Information transmitted or received by the transceiver component 1825 may include data that has been processed by the processor 1810 or instructions that are to be executed by processor 1810. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1830 might be used to store volatile data and perhaps to store instructions that are executed by the processor 1810. The ROM 1840 is a non-volatile memory device that typically has a smaller memory capacity than the memory capacity of the secondary storage 1850. ROM 1840 might be used to store instructions and perhaps data that are read during execution of the instructions. Access to both RAM 1830 and ROM 1840 is typically faster than to secondary storage 1850. The secondary storage 1850 is typically comprised of one or more disk drives or tape drives and might be used for non-volatile storage of data or as an over-flow data storage device if RAM 1830 is not large enough to hold all working data. Secondary storage 1850 may be used to store programs that are loaded into RAM 1830 when such programs are selected for execution.

The I/O devices 1860 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1825 might be considered to be a component of the I/O devices 1860 instead of or in addition to being a component of the network connectivity devices 1820.

The following are incorporated herein by reference for all purposes: 3GPP TR 36.211, 3GPP TR 36.213, and 3GPP TR 36.814.

In an embodiment, a method is provided for searching for a pairing PMI. The method includes estimating a multiple input/multiple output (MIMO) wireless propagation channel from an access point transmitter to a receiver at a user equipment (UE); quantizing the estimated channel with a codebook consisting of a plurality of codewords, the quantization result being or an actual SU-MIMO PMI currently applicable to the UE; estimating the channel quality corresponding to the actual SU-MIMO PMI, resulting in at least one channel quality indicator (CQI) for the UE; constructing a plurality of subsets from a codebook of codewords, wherein each subset comprises potential multi-user MIMO (MU-MIMO) PMIs that represent channels that have reduced interference with a channel represented by one of the potential SU-MIMO PMIs; associating each potential SU-MIMO PMI with the subset that comprises the potential MU-MIMO PMIs that represent channels that have reduced interference with the channel represented by that potential SU-MIMO PMI; and searching for an appropriate pairing PMI and the associated CQI for the UE only in the subset associated with the potential SU-MIMO PMI that is the same as the actual SU-MIMO PMI for the UE.

In an alternative embodiment, a UE is provided. The UE includes a processor configured such that the UE estimates a MIMO wireless propagation channel from an access point transmitter to a receiver at the UE; quantizes the estimated channel with a codebook consisting of a plurality of codewords, the quantization result being or an actual SU-MIMO PMI currently applicable to the UE; estimates the channel quality corresponding to the actual SU-MIMO PMI, resulting in at least one channel quality indicator (CQI) for the UE; constructs a plurality of subsets from a codebook of codewords, wherein each subset comprises potential multi-user MIMO (MU-MIMO) PMIs that represent channels that have reduced interference with a channel represented by one of the potential SU-MIMO PMIs; associates each potential SU-MIMO PMI with the subset that comprises the potential MU-MIMO PMIs that represent channels that have reduced interference with the channel represented by that potential SU-MIMO PMI; and searches for an appropriate pairing PMI and the associated CQI for the UE only in the subset associated with the potential SU-MIMO PMI that is the same as the actual SU-MIMO PMI for the UE.

In an alternative embodiment, a method is provided for reducing overhead in feedback of information related to a potential MU-MIMO transmission between an access node, a first UE, and a second UE. The method includes feeding back from the first UE to the access node a single-user MIMO (SU-MIMO) precoding matrix indicator (PMI) associated with a subset of a codebook of codewords, each of the codewords in the subset representing a channel that has reduced interference with a channel represented by the SU-MIMO PMI, and each of the codewords in the subset being represented by a potential MU-MIMO PMI. The method further includes feeding back from the first UE to the access node a designation of which MU-MIMO PMI in the subset is a preferred PMI for the second UE.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for searching for a pairing precoding matrix indicator (PMI), comprising:
    estimating a multiple input/multiple output (MIMO) wireless propagation channel from an access point transmitter to a receiver at a user equipment (UE);
    quantizing the estimated channel with a codebook consisting of a plurality of codewords, the quantization result being an actual single user MIMO (SU-MIMO) PMI of a plurality of potential SU-MIMO PMIs currently applicable to the UE;
    estimating a channel quality corresponding to the actual SU-MIMO PMI, resulting in at least one channel quality indicator (CQI) for the UE;
    constructing a plurality of subsets from the codebook of codewords, wherein each subset comprises potential multi-user MIMO (MU-MIMO) PMIs that represent channels that have reduced interference with a channel represented by one of the plurality of potential SU-MIMO PMIs;
    associating each of the plurality of potential SU-MIMO PMIs with a subset of the plurality of subsets that comprises the potential MU-MIMO PMIs that represent channels that have reduced interference with the channel represented by the each of the plurality of potential SU-MIMO PMIs;
    searching for an appropriate potential MU-MIMO PMI and an associated CQI for the UE only in the subset associated with the each of the plurality of potential SU-MIMO PMIs that is the same as the actual SU-MIMO PMI for the UE; and
    pairing the appropriate potential MU-MIMO PMI with the actual SU-MIMO PMI for the UE.

2. The method of claim 1, wherein each subset of the plurality of subsets comprises one of:
    codewords that are orthogonal to one another and to the codeword represented by the each of the plurality of potential SU-MIMO PMIs associated with the subset;
    codewords that are orthogonal to the codeword represented by the each of the plurality of potential SU-MIMO PMIs associated with the subset but that are not necessarily orthogonal to one another and;
    codewords that have a chordal distance to the codeword indicated by the each of the plurality of potential SU-MIMO PMIs that is greater than a threshold, wherein the threshold is predefined such that channels represented by the codewords will have reduced interference with the channel represented by the each of the plurality of potential SU-MIMO PMIs associated with the subset.

3. The method of claim 1, wherein, when the appropriate potential MU-MIMO PMI and the actual SU-MIMO PMI for the UE are paired, the paired potential MU-MIMO PMI and the actual SU-MIMO PMI are fed back to an access node.

4. The method of claim 3, wherein the feedback to the access node comprises a designation of the each of the plurality of potential SU-MIMO PMIs associated with the subset that includes the paired potential MU-MIMO PMI and further comprises a designation of which MU-MIMO PMI within the subset is the paired MU-MIMO PMI.

5. The method of claim 4, wherein the feedback to the access node further comprises an actual channel quality indication (CQI) calculated based on the actual SU-MIMO PMI and further comprises a paired potential MU-MIMO CQI specified as a differential from the actual SU-MIMO CQI.

6. The method of claim 5, wherein the access node uses the actual SU-MIMO PMI, the paired potential MU-MIMO PMI, the actual SU-MIMO CQI, and the paired potential MU-MIMO CQI to assign a modulation and coding scheme to a MU-MIMO transmission to the UE and to a second UE associated with the paired potential MU-MIMO PMI.

7. The method of claim 6, wherein the UE and the second UE are of different ranks.

8. The method of claim 6, wherein the UE selects and feeds back to the access node a plurality of paired potential MU-MIMO PMIs.

9. The method of claim 8, wherein at least one additional UE is paired with the UE and the second UE in the MU-MIMO transmission.

10. The method of claim 3, wherein the access node specifies the configuration the UE is to use for the feedback.

11. The method of claim 3, wherein the access node, based on considerations of feedback accuracy and feedback overhead, informs the UE whether to search for the paired potential MU-MIMO PMI in one of the subsets or in the entire codebook.

12. A user equipment (UE), comprising:
    a processor configured to:
        estimate a multiple input/multiple output (MIMO) wireless propagation channel from an access point transmitter to a receiver at the UE;
        quantize the estimated channel with a codebook consisting of a plurality of codewords, the quantization result being an actual single user MIMO (SU-MIMO) precoding matrix indicator (PMI) currently applicable to the UE;

estimate a channel quality corresponding to the actual SU-MIMO PMI, resulting in at least one channel quality indicator (CQI) for the UE;

construct a plurality of subsets from the codebook of codewords, wherein each subset comprises potential multi-user MIMO (MU-MIMO) PMIs that represent channels that have reduced interference with a channel represented by one of the plurality of potential SU-MIMO PMIs;

associate each of the plurality of potential SU-MIMO PMIs with a subset of the plurality of subsets that comprises the potential MU-MIMO PMIs that represent channels that have reduced interference with the channel represented by the each of the plurality of potential SU-MIMO PMIs;

search for an appropriate potential MU-MIMO PMI and an associated CQI for the UE only in the subset associated with the each of the plurality of potential SU-MIMO PMIs that is the same as the actual SU-MIMO PMI for the UE; and pair the appropriate potential MU-MIMO PMI with the actual SU-MIMO PMI for the UE.

13. The UE of claim 12, wherein each subset of the plurality of subsets comprises one of:

codewords that are orthogonal to one another and to the codeword represented by the each of the plurality of potential SU-MIMO PMI associated with the subset;

codewords that are orthogonal to the codeword represented by the each of the plurality of potential SU-MIMO PMIs associated with the subset but that are not necessarily orthogonal to one another and;

codewords that have a chordal distance to the codeword indicated by the each of the plurality of potential SU-MIMO PMIs that is greater than a threshold, wherein the threshold is predefined such that channels represented by the codewords will have reduced interference with the channel represented by the each of the plurality of potential SU-MIMO PMIs associated with the subset.

14. The UE of claim 12, wherein, when the appropriate potential MU-MIMO PMI and the actual SU-MIMO PMI for the UE are paired, the appropriate potential MU-MIMO PMI and the actual SU-MIMO PMI are fed back to an access node.

15. The UE of claim 14, wherein the feedback to the access node comprises a designation of the each of the potential SU-MIMO PMIs associated with the subset that includes the paired potential MU-MIMO PMI and further comprises a designation of which MU-MIMO PMI within the subset is the paired potential MU-MIMO PMI.

16. The UE of claim 15, wherein the feedback to the access node further comprises an actual channel quality indication (CQI) calculated based on the actual SU-MIMO PMI and further comprises a potential MU-MIMO CQI specified as a differential from the actual SU-MIMO CQI.

17. The UE of claim 16, wherein the access node uses the actual SU-MIMO PMI, the paired potential MU-MIMO PMI, the actual SU-MIMO CQI, and the potential MU-MIMO CQI to assign a modulation and coding scheme to a MU-MIMO transmission to the UE and to a second UE associated with the pairing PMI.

18. The UE of claim 17, wherein the UE and the second UE are of different ranks.

19. The UE of claim 17, wherein the UE selects and feeds back to the access node a plurality of appropriate potential MU-MIMO PMIs.

20. The UE of claim 19, wherein at least one additional UE is paired with the UE and the second UE in the MU-MIMO transmission.

\* \* \* \* \*